(12) United States Patent
Kim

(10) Patent No.: US 9,011,744 B2
(45) Date of Patent: Apr. 21, 2015

(54) METHOD FOR MANUFACTURING BALL JOINT

(71) Applicant: Central Corporation, Changwon, Gyeongsangnam-Do (KR)

(72) Inventor: Seong-Rok Kim, Gyeongsangnam-Do (KR)

(73) Assignee: Central Corporation, Changwon, Gyeongsangnam-do (KR)

( * ) Notice: Subject to any disclaimer, the term of this patent is extended or adjusted under 35 U.S.C. 154(b) by 0 days.

(21) Appl. No.: 13/926,506

(22) Filed: Jun. 25, 2013

(65) Prior Publication Data

US 2013/0285269 A1 Oct. 31, 2013

Related U.S. Application Data

(60) Division of application No. 13/269,207, filed on Oct. 7, 2011, now Pat. No. 8,651,852, which is a continuation of application No. PCT/KR2010/000726, filed on Feb. 5, 2010.

(30) Foreign Application Priority Data

May 7, 2009 (KR) .................. 10-2009-0039632

(51) Int. Cl.
*B29C 45/14* (2006.01)
*B29C 45/03* (2006.01)
*F16C 11/06* (2006.01)
*B29L 31/04* (2006.01)

(52) U.S. Cl.
CPC ....... *B29C 45/14754* (2013.01); *B29L 2031/04* (2013.01); *F16C 11/0657* (2013.01)

(58) Field of Classification Search
CPC .................. B29C 45/14754; B29L 2031/04; F16C 11/0657
USPC ........................................ 264/242; 425/451.7
See application file for complete search history.

(56) References Cited

U.S. PATENT DOCUMENTS

2010/0267597 A1* 10/2010 Shimura et al. ............... 508/283

* cited by examiner

*Primary Examiner* — Yogendra Gupta
*Assistant Examiner* — Robert J Grun
(74) *Attorney, Agent, or Firm* — Mintz Levin Cohn Ferris Glovsky and Popeo, P.C.; Kongsik Kim

(57) ABSTRACT

Provided is an apparatus and method for manufacturing a ball joint that are capable of reducing a torque applied between a ball stud and a ball seat.

The ball joint manufacturing apparatus includes an upper mold having a shape configured to injection-mold a ball seat formed of a synthetic resin material and surrounding the outside of a spherical head part of a ball stud; a lower mold installed under the upper mold and having a molding surface for forming a portion of the ball seat; a fixing jig configured to fix the ball stud to a molding position of the upper mold and the lower mold; and a rotary member configured to rotate the fixing jig.

4 Claims, 6 Drawing Sheets

METHOD FOR MANUFACTURING BALL JOINT

CROSS-REFERENCE TO RELATED APPLICATIONS

The present application is a divisional application of application Ser. No. 13/269,207 filed on Oct. 7, 2011, which is a continuation of PCT/KR2010/000726 filed on Feb. 5, 2010, which claims priority to Korean Application No. 10-2009-0039632 filed on May 7, 2009, which applications are incorporated herein by reference.

TECHNICAL FIELD

The present invention relates to a method for manufacturing a ball joint, and more particularly, to an apparatus and method for manufacturing a ball joint that are capable of reducing a rotational torque of the ball joint.

BACKGROUND ART

In general, since many impacts may be applied to wheels of a vehicle depending on road surface conditions, a suspension apparatus is installed to absorb shocks such that the impacts cannot be directly transmitted to a vehicle body.

A ball joint, which can be rotated and inclined in an arbitrary plane, is generally used in a steering or suspension system of a vehicle.

Such a ball joint is configured such that a spherical head part of a ball stud is inserted into a ball seat to be rotated or inclined in the ball seat, the ball seat is fixed by a housing, and a dust cover is fixed between ends between the housing and the ball seat.

In order to simplify a manufacturing process, such a ball joint is formed through a well known method of integrally injection-molding a ball seat formed of a synthetic resin material at the outside of a spherical head part of a ball stud.

FIG. 1 is a view showing a state in which a conventional ball stud and a conventional ball seat are integrally injection-molded, and FIG. 2 is a view showing a state in which grease is applied after the ball stud and the ball seat are integrally injection-molded.

Referring to FIG. 1, a ball stud 10, and a ball seat 20 formed of a synthetic resin material, which constitute a ball joint, are provided. The ball stud 10 has a spherical head part 11 that can be rotated and inclined in the ball seat 20.

The ball seat 20 is integrally formed outside the spherical head part 11 of the ball stud 10 through injection molding. After the injection molding, cooling is performed. Upon cooling, a volume of the ball seat 20 formed of a synthetic resin material is reduced in a direction of the spherical head part 11, and thus, a tightening force applied to the spherical head part 11 is increased after the cooling, increasing a torque.

In addition, grease is applied between an outer circumference of the spherical head part 11 and an inner circumference 20a of the ball seat 20 to secure smooth rotation therebetween. For this, as shown in FIG. 2, after the grease is applied to an upper end of the spherical head part 11 after the cooling, the ball stud 10 is rotated and rolled to fill the grease between the outer circumference of the spherical head part 11 and the inner circumference 20a of the ball seat 20. However, as described above, due to contraction of the ball seat 20 upon cooling, a space between the outer circumference of the spherical head part 11 and the inner circumference 20a of the ball seat 20 is narrowed such that the space cannot be filled with the grease. Accordingly, a torque generated between the ball stud 10 and the ball seat 20 cannot be easily reduced.

SUMMARY OF THE DISCLOSURE

In order to solve the foregoing and/or other problems, it is an object of the present invention to provide a method for manufacturing a ball joint that are capable of reducing a torque applied between a ball stud and a ball seat.

The foregoing and/or other aspects of the present invention may be achieved by providing a method of manufacturing a ball joint in which a ball seat formed of a synthetic resin material is integrally formed with a ball stud, including: a) fixing the ball stud into an upper mold and a lower mold and closing the molds; b) injection-molding the ball seat outside a spherical head part of the ball stud; and c) rotating the ball stud during cooling of the molded ball seat.

According to the present invention, contraction of a ball seat generated upon formation thereof is reduced such that grease can be easily filled between a spherical head part of a ball stud and an inner circumference of the ball seat. As a result, a torque applied between the spherical head part and the inner circumference of the ball seat when the ball stud is rotated can be reduced to improve durability and reliability of the ball joint.

BRIEF DESCRIPTION OF DRAWINGS

The above and other aspects and advantages of the present invention will become apparent and more readily appreciated from the following description of exemplary embodiments, taken in conjunction with the accompanying drawings of which.

<Description of Major Reference Numerals>

| | |
|---|---|
| 10: Ball stud | 11: Spherical head part |
| 20: Ball seat | 100: Upper mold |
| 110: Cavity | 200: Lower mold |
| 210: Support end part | 220: Slide groove |
| 300: Fixing jig | 400: Cylinder |
| 410: Connecting member | 411: Slide part |

DETAILED DESCRIPTION

Reference will now be made in detail to the embodiments of the present invention, examples of which are illustrated in the accompanying drawings.

Figure 1:
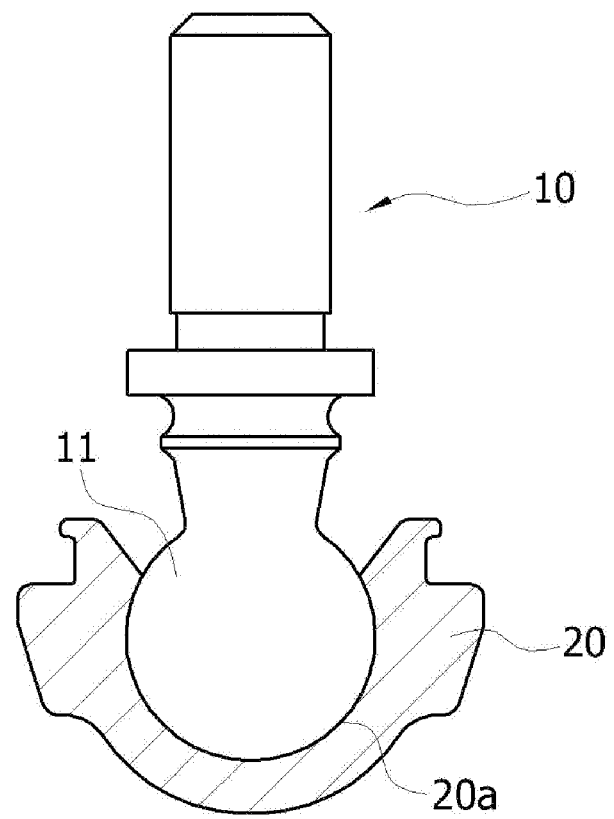
FIG. 1 is a view showing a state in which a conventional ball stud and a conventional ball seat are integrally injection-molded.
Figure 2:
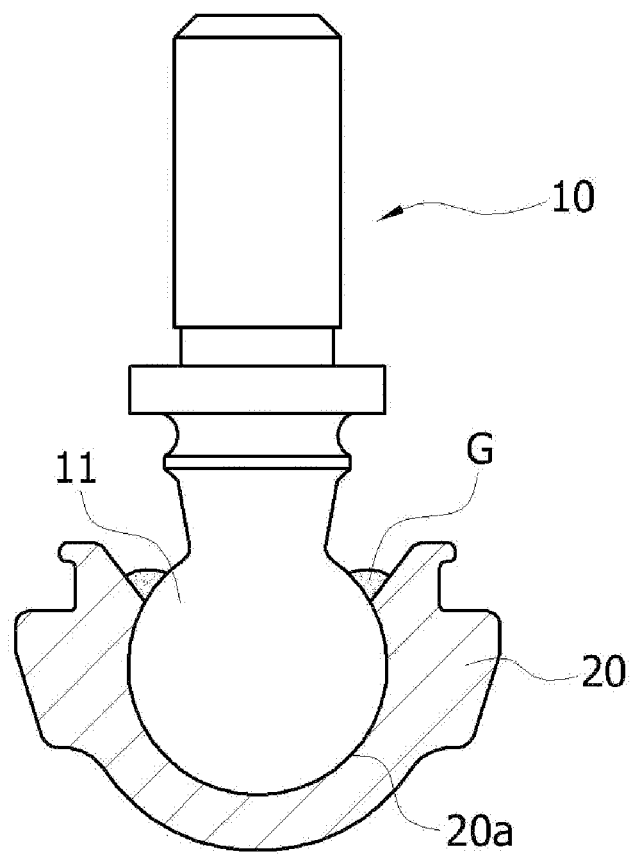
FIG. 2 is a view showing a state in which grease is applied after the ball stud and the ball seat are integrally injection-molded.
Figure 3:
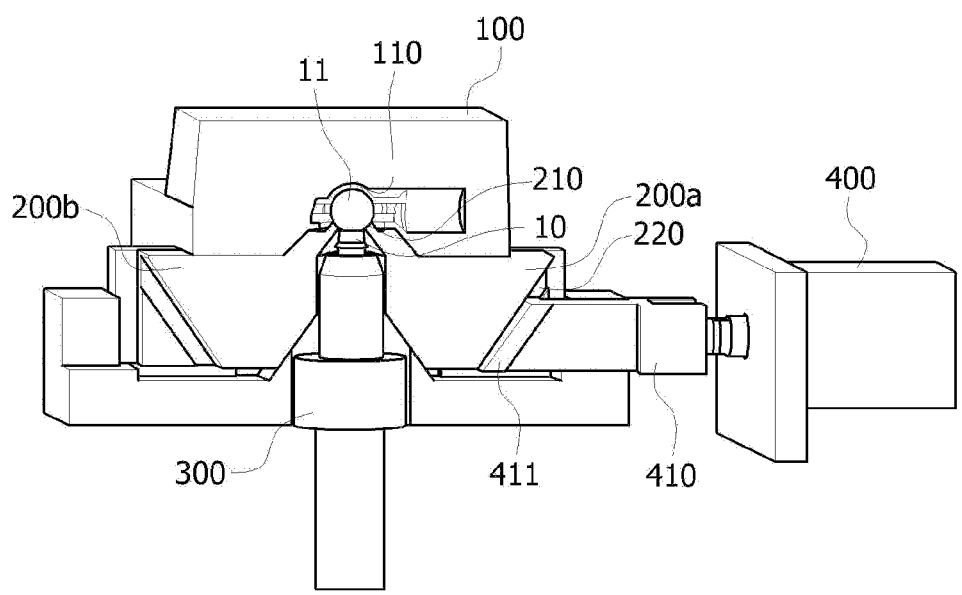
FIG. 3 is a partially cut perspective view showing a ball joint manufacturing apparatus in accordance with an exemplary embodiment of the present invention.

FIG. 3 is a partially cut perspective view showing a ball joint manufacturing apparatus in accordance with an exemplary embodiment of the present invention.

The ball joint manufacturing apparatus of the present invention includes an upper mold 100 having a shape for injection-molding a ball seat 20 surrounding the outside of a spherical head part 11 of a ball stud 10 and formed of a synthetic resin material, a lower mold 200 installed under the upper mold 100 and having a molding surface for forming a portion of the ball seat 20, a fixing jig 300 configured to fix the ball stud 10 to a molding position of the upper mold 100 and the lower mold 200, and a rotary member (not shown) configured to rotate the fixing jig 300.

A cavity 110 having a ball seat shape is formed in a space between an inner surface of the upper mold 100 and an outer circumference of the spherical head part 11 of the ball stud 10. A synthetic resin injection is introduced into the cavity 110 to integrally form the ball seat 20 at the outer circumference of the spherical head part 11.

The lower mold 200 (200a and 200b) includes a molding surface coupled to the upper mold 100 to form the ball seat 20, and a support end 210 for supporting the spherical head part 11 of the ball stud 10 formed at a center upper part. In addition, a slide groove 220 is formed at an edge of the lower mold 200 to be inclined inward to vary a position of the lower mold 200 after formation of the ball seat 20.

Since the ball stud 10 is fixed to the upper end, the fixing jig 300 fixes the spherical head part 11 of the ball stud 10 to an inner space of the cavity 110.

The rotary member rotates the fixing jig 300 and the ball stud 10 coupled thereto to prevent contraction of the ball seat 20 in a direction of the spherical head part 11. Accordingly, a space into which grease can infiltrate can be secured between an outer circumference of the spherical head part 11 of the ball stud 10 and an inner circumference 20a of the molded ball seat 20 so that a torque upon rotation of the ball stud 10 can be reduced.

In this case, a cylinder 400 for spacing the lower mold 200 a predetermined distance from the outer circumference of the ball stud 10 may be provided. When the fixing jig 300 and the ball stud 10 are rotated by the rotary member, if the outer circumference of the spherical head part 11 is in contact with the support end 210, the outer circumference of the spherical head part 11 is scratched and rotated. In order to prevent the scratch, the cylinder 400 is operated after the formation to space the support end 210 of the lower mold 200 from the outer circumference of the spherical head part 11.

One end of a connecting member 410 is coupled to the cylinder 400, and the connecting member 410 is horizontally reciprocated when the cylinder 400 is operated. A slide part 411 projects from the other end of the connecting member 410 to be inserted into the slide groove 220 of the lower mold 200 to perform slide movement of the lower mold 200. Accordingly, when the cylinder 400 is operated, the connecting member 410 is horizontally moved and the lower mold 200 is guided by the slide part 411 in an inclined downward direction to space the support end 210 of the lower mold 200 from the outer circumference of the spherical head part 11. While FIG. 3 shows that the cylinder 400 is connected to only one lower mold 200a, the cylinder 400 should be connected to the other lower mold 200b.

Meanwhile, the rotary member may include, for example, a motor. When the ball stud 10 is rotated using the motor, a torque caused by friction between the outer circumference of the spherical head part 11 of the ball stud 10 and the inner circumference 20a of the molded ball seat 20 occurs. A control unit configured to control driving of the motor includes a torque detection part (not shown) for detecting a torque generated when the ball stud 10 is rotated.

Hereinafter, a method of manufacturing a ball joint using the ball joint manufacturing apparatus will be described with reference to FIGS. 4 to 6.

Figure 4:
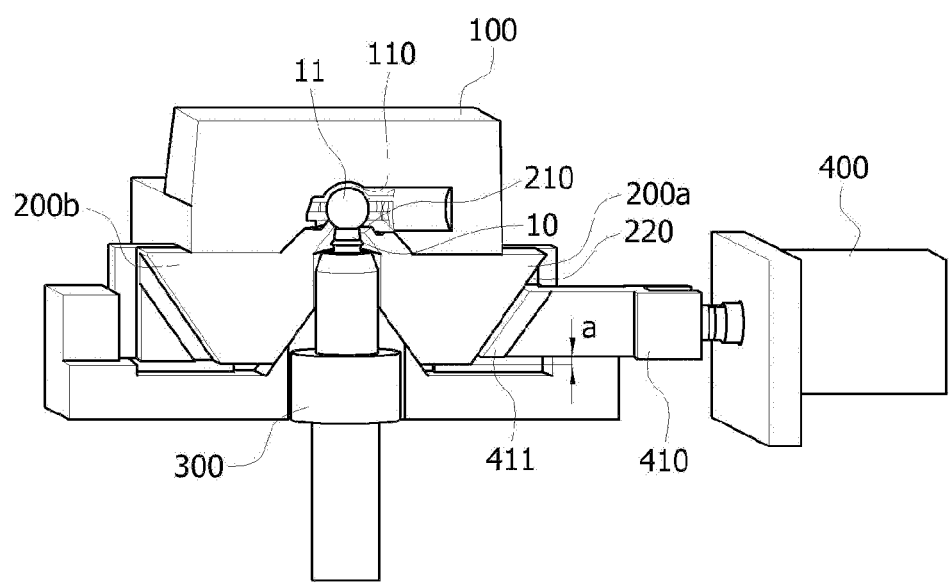
FIG. 4 is a view showing when a cylinder is horizontally operated in the ball joint manufacturing apparatus of the present invention.
Figure 5:
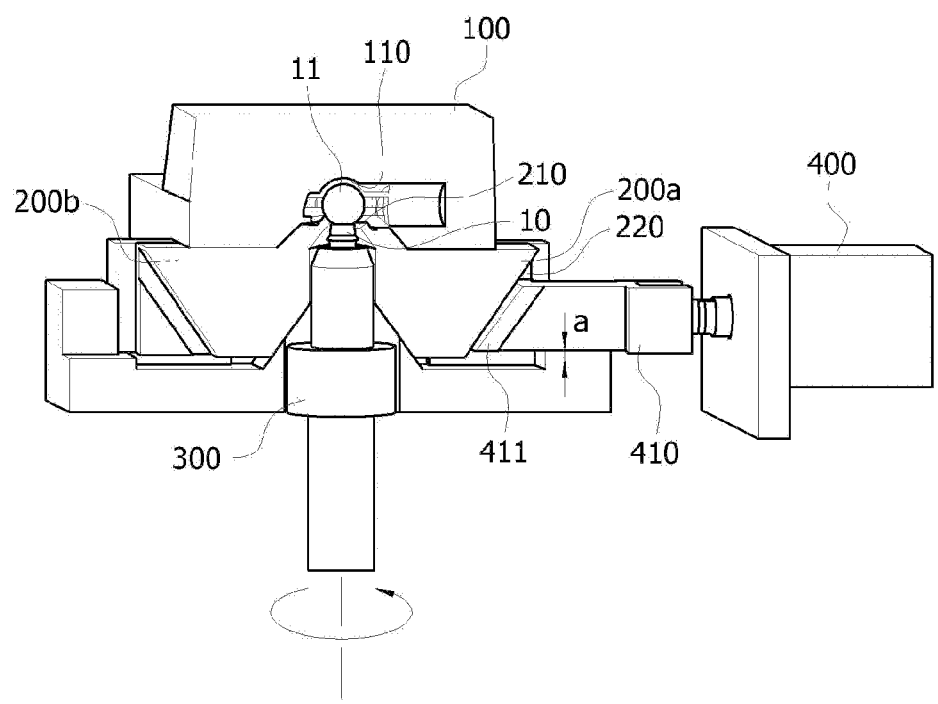
FIG. 5 is a view showing a state in which a ball stud is rotated after the cylinder is horizontally operated in the ball joint manufacturing apparatus of the present invention.
Figure 6:
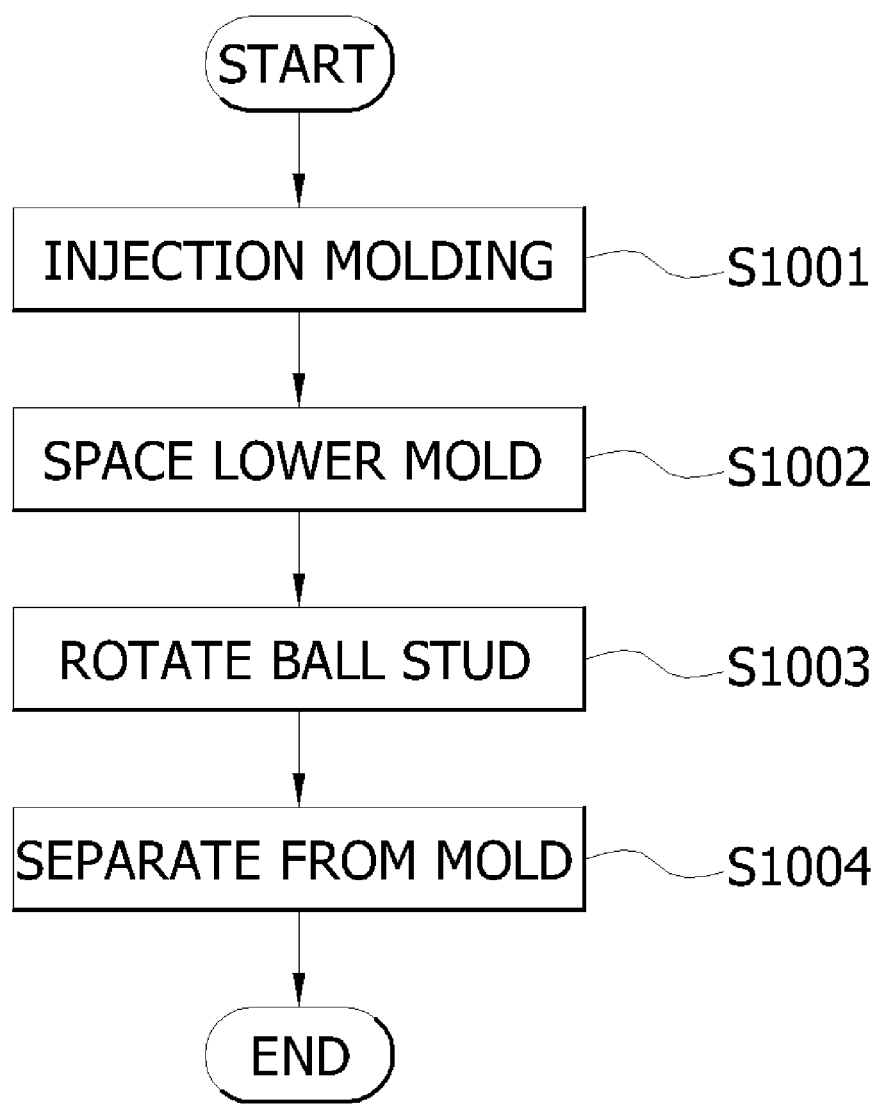
FIG. 6 is a flowchart showing a method of manufacturing a ball joint of the present invention.

FIG. 4 is a view showing when a cylinder is horizontally operated in the ball joint manufacturing apparatus of the present invention, FIG. 5 is a view showing a state in which a ball stud is rotated after the cylinder is horizontally operated in the ball joint manufacturing apparatus of the present invention, and FIG. 6 is a flowchart showing a method of manufacturing a ball joint of the present invention.

As shown in FIG. 3, first, a process of coupling an upper mold 100 and a lower mold 200 to close a mold is performed to perform injection molding. In this case, a ball stud 10 is fixed to an upper end of a fixing jig 300. A spherical head part 11 of the ball stud 10 is inserted into a cavity 110, which is a space formed in a state in which the upper mold 100 is coupled to the lower mold 200. In this state, the injection molding is performed (S1001).

Before performing the injection molding, fluorine-based liquid lubrication oil is coated on a surface of the spherical head part 11 of the ball stud 10. As described below, the ball stud 10 is rotated after injection molding. At this time, a burr, which is a part of injected matters, is generated between the surface of the spherical head part 11 and an inner circumference of the molded ball seat 20. Accordingly, in order to prevent generation of the burr, in a state in which the fluorine-based liquid lubrication oil is coated on the surface of the spherical head part 11, the injection molding is performed and the ball stud 10 is rotated. Since a fluorine element is included in the lubrication oil, the ball joint can endure a high temperature. When liquid lubrication oil is used, the surface of the spherical head part 11 can be coated with a small amount of oil. Since the fluorine-based liquid lubrication oil remains even after the injection molding and cooling, there is no need to separately fill grease.

Upon the injection molding, a melted synthetic resin (plastic) material is about 280° C. at an initial state, and lowered to about 180° C. when the melted material is injected into a cavity 110 in the mold. Then, a cooling process is performed until the melted material is solidified at a time the melted material contacts the surface of the spherical head part 11 of the ball stud 10 and cooled to about 80° C.

When the injection molding is performed, in order to prevent generation of starches between an outer circumference of the spherical head part 11 and a support end 210 of the lower mold 200 upon rotation of the ball stud 10, as shown in FIG. 4, the cylinder 400 is operated to space the support end 210 of the lower mold 200 from the outer circumference of the spherical head part 11 (S1002). As a result, a pair of left and right molds 200a and 200b are lowered by a distance a.

Thereafter, a motor, which is a rotary member, is driven to rotate the fixing jig 300 and the ball stud 10 (S1003). In this case, frictional heat is generated from between the outer circumference of the spherical head part 11 and the inner circumference 20a of the molded ball seat 20 to increase a temperature of the surface of the spherical head part 11 to 80° C. or more. In order to satisfy such temperature conditions, the ball stud 10 is rotated at 500 to 100 rpm for 5 to 10 seconds. The surface temperature of the spherical head part 11 is 80° C. or more because a contraction amount of the molded ball seat 20 during the cooling can be reduced by the cooling and thus a fastening force applied to the spherical head part 11 can be reduced by maintaining the surface temperature of the spherical head part 11 at a higher temperature than a temperature (80° C.) of the melted synthetic resin material.

After the above process, rotation of the ball stud 10 is stopped and an assembly of the ball stud 10 and the ball seat 20 is separated from the mold (S1004).

While a rotational amount of the ball stud 10 has been set from a rotational speed and, a rotation time of the ball stud 10 and temperature conditions of the surface of the spherical head part 11, the rotational amount can be controlled by a torque detected by a torque detection part.

That is, when the torque detected by the torque detection part reaches a predetermined torque (i.e., a large torque is generated by friction at the beginning of rotation and the torque is reduced as the rotation progresses), it is determined that desired frictional heat is generated from between the outer circumference of the spherical head part 11 and the inner circumference 20a of the ball seat 20 (or reaches a desired temperature), and rotation of the ball stud 10 is stopped.

[Industrial Applicability]

According to the present invention, a contraction force generated upon formation of a ball seat is reduced so that grease can be easily injected between a spherical head part of a ball stud and an inner circumference of the ball seat. As a result, a torque applied between the spherical head part and the inner circumference of the ball seat upon rotation of the ball seat can be reduced to improve durability and reliability of the ball joint.

The invention claimed is:

1. A method of manufacturing a ball joint in which a ball seat formed of a synthetic resin material is integrally formed with a ball stud, which comprises:
    a) fixing the ball stud into an upper mold and a lower mold and closing the molds;
    b) injection-molding the ball seat outside a spherical head part of the ball stud; and
    c) rotating the ball stud during cooling of the molded ball seat, wherein a surface temperature of the spherical head part of the ball stud reaches 80° C. or more by rotation of the ball stud.

2. The method according to claim 1, wherein, in step a), a surface of the spherical head part of the ball stud is coated with fluorine-based liquid lubrication oil.

3. The method according to claim 1, wherein a torque generated upon rotation of the ball stud is detected, and the rotation of the ball stud is stopped when the detected torque reaches a predetermined torque.

4. The method according to claim 1, wherein, in step c), the ball stud is rotated at 500 to 1000 rpm for 5 to 10 seconds.

* * * * *